US011440685B2

(12) United States Patent
Goff et al.

(10) Patent No.: US 11,440,685 B2
(45) Date of Patent: Sep. 13, 2022

(54) ROBOTIC CAPTURE INTERFACE

(71) Applicant: Altius Space Machines Inc., Broomfield, CO (US)

(72) Inventors: Jonathan Andrew Goff, Lafayette, CO (US); Joshua Charles Nelson, Broomfield, CO (US); Shreya Udupa, Boulder, CO (US)

(73) Assignee: Altius Space Machines Inc., Broomfield, CO (US)

( * ) Notice: Subject to any disclaimer, the term of this patent is extended or adjusted under 35 U.S.C. 154(b) by 891 days.

(21) Appl. No.: 16/269,427

(22) Filed: Feb. 6, 2019

(65) Prior Publication Data

US 2019/0241286 A1 Aug. 8, 2019

Related U.S. Application Data

(60) Provisional application No. 62/626,880, filed on Feb. 6, 2018.

(51) Int. Cl.
| | |
|---|---|
| *B25J 15/00* | (2006.01) |
| *B64G 1/66* | (2006.01) |
| *H04N 5/225* | (2006.01) |
| *B25J 15/02* | (2006.01) |
| *G06K 7/10* | (2006.01) |
| *B25J 11/00* | (2006.01) |

(52) U.S. Cl.
CPC ............. *B64G 1/66* (2013.01); *B25J 11/00* (2013.01); *B25J 15/00* (2013.01); *B25J 15/0226* (2013.01); *G06K 7/10821* (2013.01); *H04N 5/2252* (2013.01); *H04N 5/2257* (2013.01)

(58) Field of Classification Search
CPC ... B64G 1/66; B25J 11/00; B25J 15/00; B25J 15/0226; G06K 7/10821; H04N 5/2252; H04N 5/2257
See application file for complete search history.

(56) References Cited

U.S. PATENT DOCUMENTS

| | | |
|---|---|---|
| 4,259,876 A | 4/1981 | Belyanin et al. |
| 4,395,006 A | 7/1983 | Taylor |
| 5,145,130 A | 9/1992 | Purves |
| 5,509,707 A | 4/1996 | Schauer |
| 7,479,198 B2 | 1/2009 | Guffrey et al. |
| 7,551,419 B2 | 6/2009 | Pelrine et al. |
| 7,773,363 B2 | 8/2010 | Pelrine et al. |
| 2003/0229420 A1 | 12/2003 | Buckingham et al. |
| 2006/0237126 A1 | 10/2006 | Guffrey et al. |

(Continued)

OTHER PUBLICATIONS

"Engineering Issues for all Major Modes of In Situ Space Debris Capture", downloaded Jul. 28, 2011 from American Institute of Aeronautics and Astronautics (AIAA), AIAA 2010-8863, http://sfx.galib.uga.edu/sfx_qit1?url_ver=Z39.88-2004&ctx, Authors M.H. Kaplan, B. Boone, R. Brown, T.B. Criss, E. W. Tunstel, 21 pages.

(Continued)

*Primary Examiner* — Mathew Franklin Gordon
(74) *Attorney, Agent, or Firm* — Thomas J. Lavan

(57) ABSTRACT

A capture interface is provided. The capture interface is configured to be rigidly affixed to an external surface of a recovery object and captured by a capture device. The capture interface includes a matte ferromagnetic surface of flat disposition and geometric outline, configured to facilitate capture by the capture device. The ferromagnetic surface includes a capture interface identifier.

20 Claims, 12 Drawing Sheets

(56) References Cited

U.S. PATENT DOCUMENTS

| | | |
|---|---|---|
| 2007/0063375 A1 | 3/2007 | Tuma |
| 2008/0169003 A1 | 7/2008 | Curtis |
| 2008/0237400 A1 | 10/2008 | Gryniewski et al. |

OTHER PUBLICATIONS

Tilted Janus polymer pillars, Myoung-Woon Moon, Tae-GonCha, Kwang-Ryeol Lee, Ashkan Vaziri, and Ho-Young Kim, www.rsc.org/softmatter, accepted Apr. 28, 2010.

Book: Force Control of Robotic Systems, 1997, Dmitri Gorinevsky, Alexander Formalsky, and Anatoli Schneider, CRC Press.

Smooth vertical surface climbing with directional adhesion, Sangbae Kim, Matthew Spenko, Salomon Trujillo, Barrett Heyneman, Daniel Santos, Mark R. Cutkosky, IEEE Transactions on robotics, vol. 24 No. 1, Feb. 2008.

Directional adhesion for climbing: theoretical and practical considerations, Daniel Santos, Matthew Spenko, Aaron Parness, Sangbae Kim, and Mark R. Cutkosky, Center for design and research, Stanford University, Stanford, California, 94305-2232, received in final form Aug. 8, 2007.

Climbing rough vertical surfaces with hierarchical directional adhesion, Alan Asbeck, Sanjay Dastoor, Aaron Parness, Laurel Fullerton, Noe Esparza, Daniel Soto, Barrett Heyneman, Mark Cutkosky, Stanford University, Stanford , California, 94305.

Hierarchically branched Gecko-like structures imprinted using porous alumina templates, A. Y. Y. Ho, I. Rodriguez, Y. C. Lam, Institute of materials research and engineering, Agency for Science, Technology and research (A*STAR), 3 Research Link, Singapore 117602, School of mechanical and aerospace engineering, Nanyang technological university, NSTI-Nanotech 2010, www.nsti.org, ISBN 978-1-4398-3402-2 vol. 2, 2010.

Flexible carbon-nanofiber connectors with Anisotropic adhesion properties, Hyunhyub Ko, Zhenxing Zhang, Johnny C. Ho, Kuniharu Takei, Rehan Kapadia, Yu-Lun Chueh, Weizhen Cao, Brett A. Cruden, Ali Javey, Wiley Interscience, www.small-journal.com, Small 2009, Oct. 2, 2009, 2009 Wiley-VCH Verlag GmBH & Co., KGaA, Weinheim.

Hybrid core-multishell nanowire forests for electrical connector applications, Rehan Kapadia, Hyunhyub Ko, Yu-Lun Chueh, Johnny C. Ho, Toshitake Takahashi, Zhenxing Zhang, Ali Javey, Department of electrical engineering and computer sciences, University of California at Berkeley, Published Jul. 1, 2009, Applied Physics Letters 94, 263110 (2009), 2009 American Institute of Physics.

Wet and dry adhesion properties of self-selective nanowire connectors, Hyunhyub Ko, Zhenxing Zhang, Yu-Lun Chueh, Johnny C. Ho, Jongho Lee, Ronald S. Fearing, Ali Javey, Advanced functional Materials 2009, Published Aug. 25, 2009, 19, 3098-3 102, www.afm-journal.de, Wiley Interscience, 2009 Wiley-VCH Verlag GmBH & Co, KGaA, Weinheim.

Book: Introduction to robotics: Mechanics and Control (3rd Edition), 2005, John J. Craig, Pearson/Prentice Hall.

Book: Robot Force Control, 1999, Bruno Siciliano and Luigi Villani, Kluwer Academic Press.

Wikipedia "Lagrangian Point", http://en.wikipedia.org/wiki/Lagrangian_point, downloaded Nov. 20, 2012.

Fig. 1 Servicing Spacecraft Object Capture
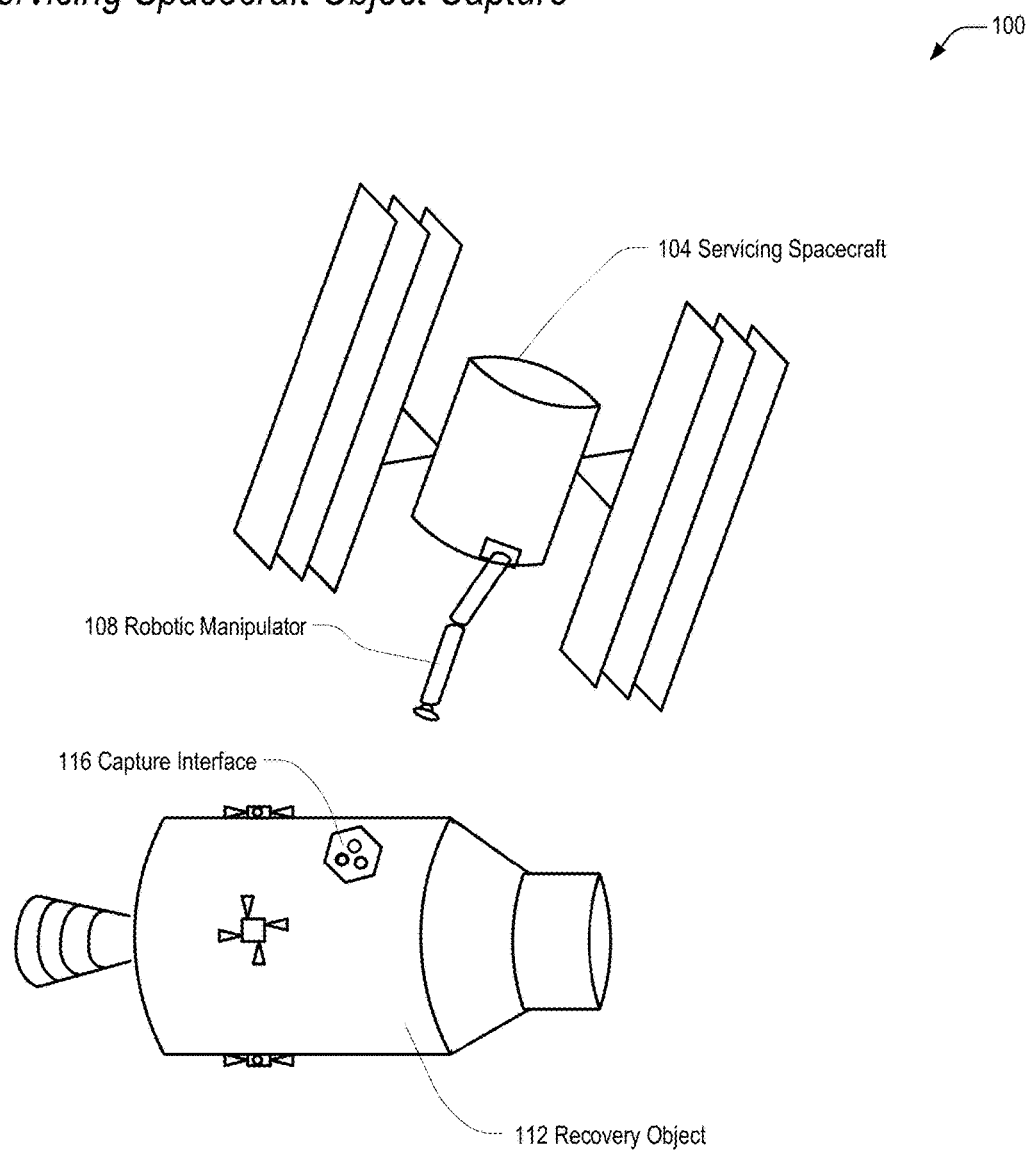

*Fig. 2A   Servicing Spacecraft and Robotic Manipulator*
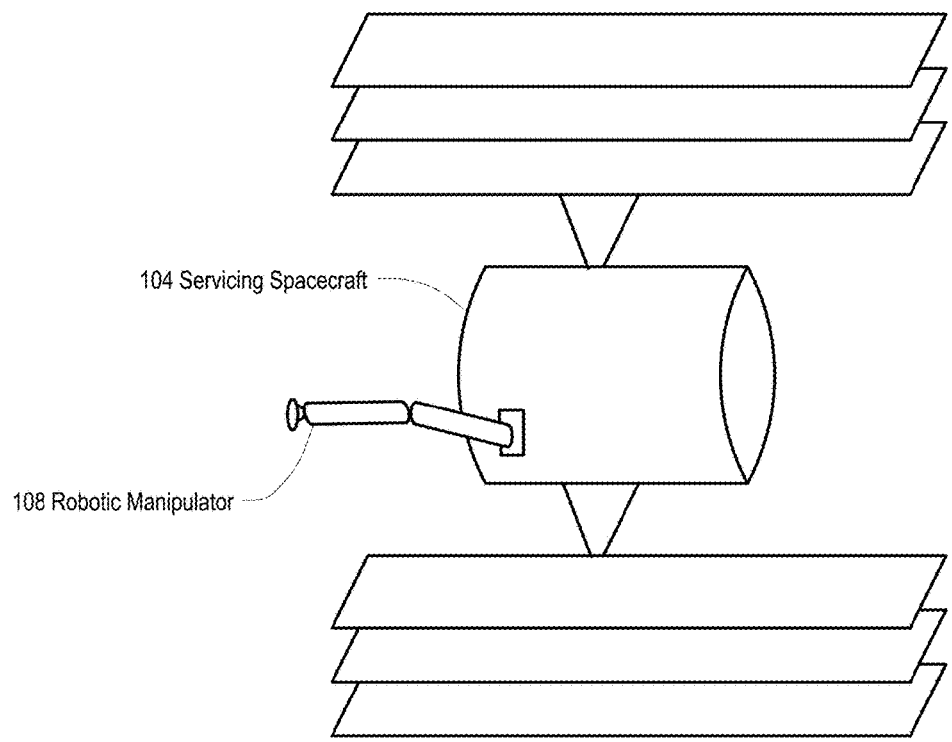
*Fig. 2B   Robotic Manipulator*
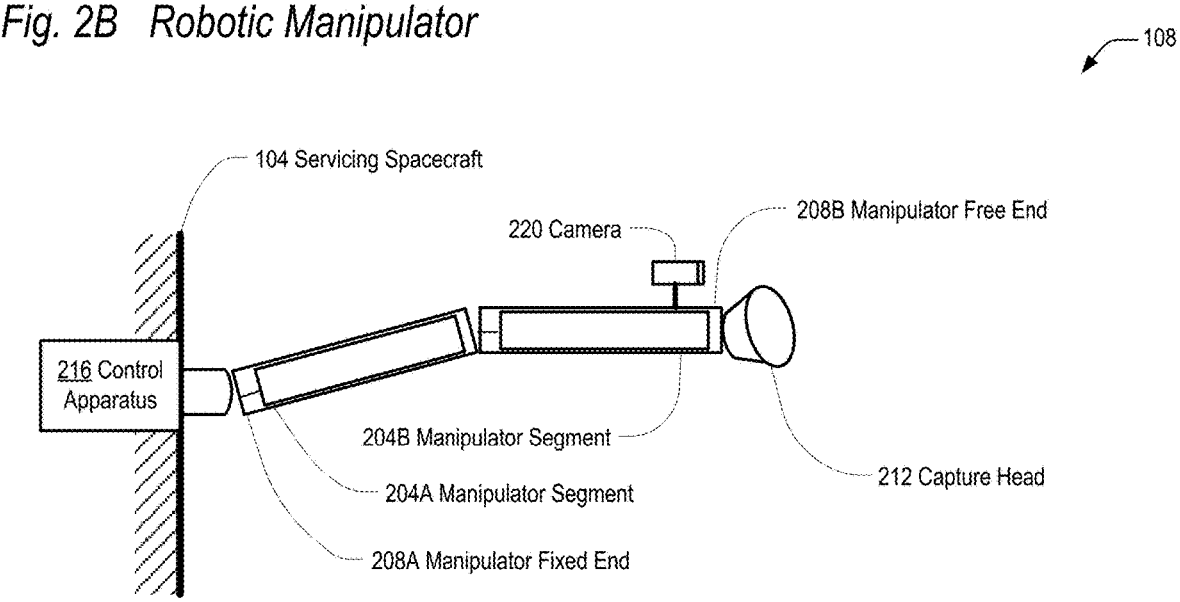

*Fig. 3A Capture Interface Top View*
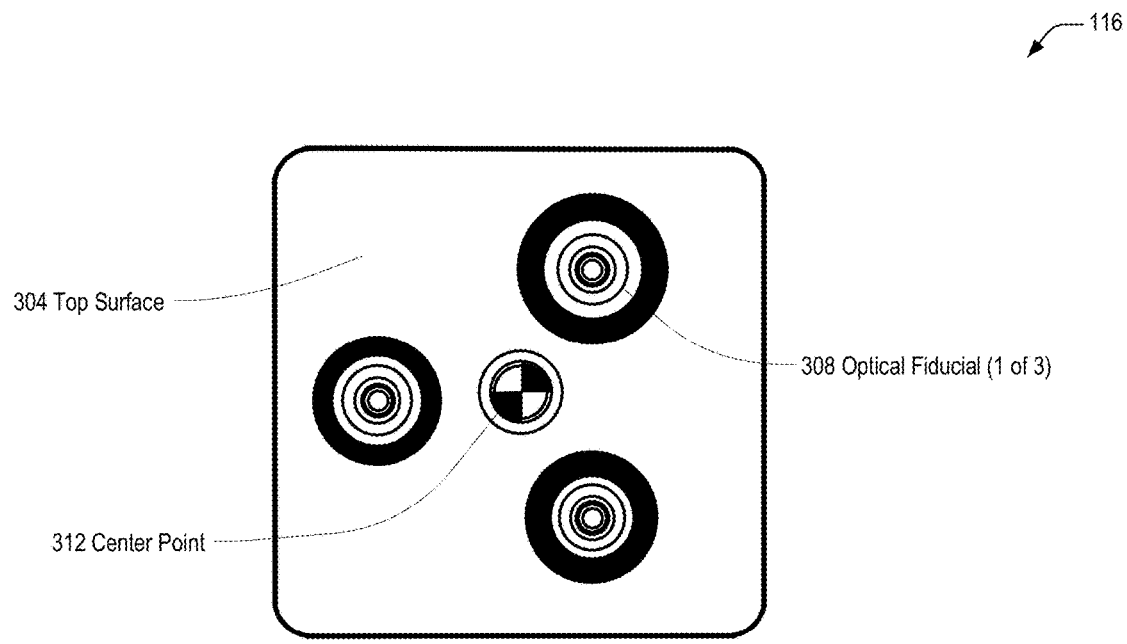
*Fig. 3B Capture Interface Orthogonal View*
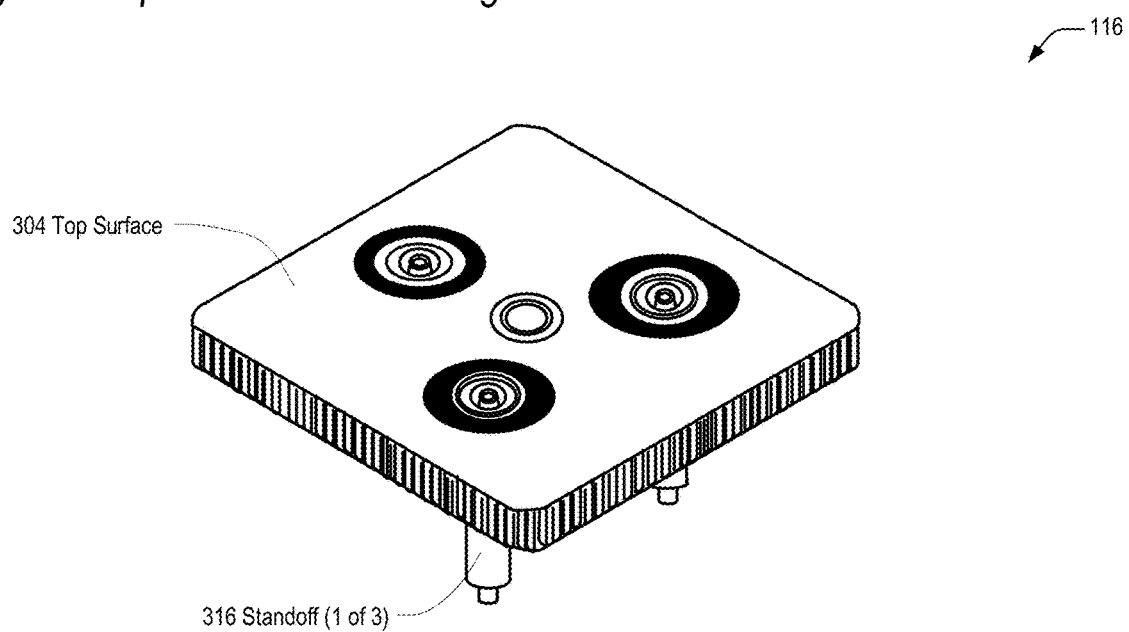

*Fig. 3C Capture Interface Components*
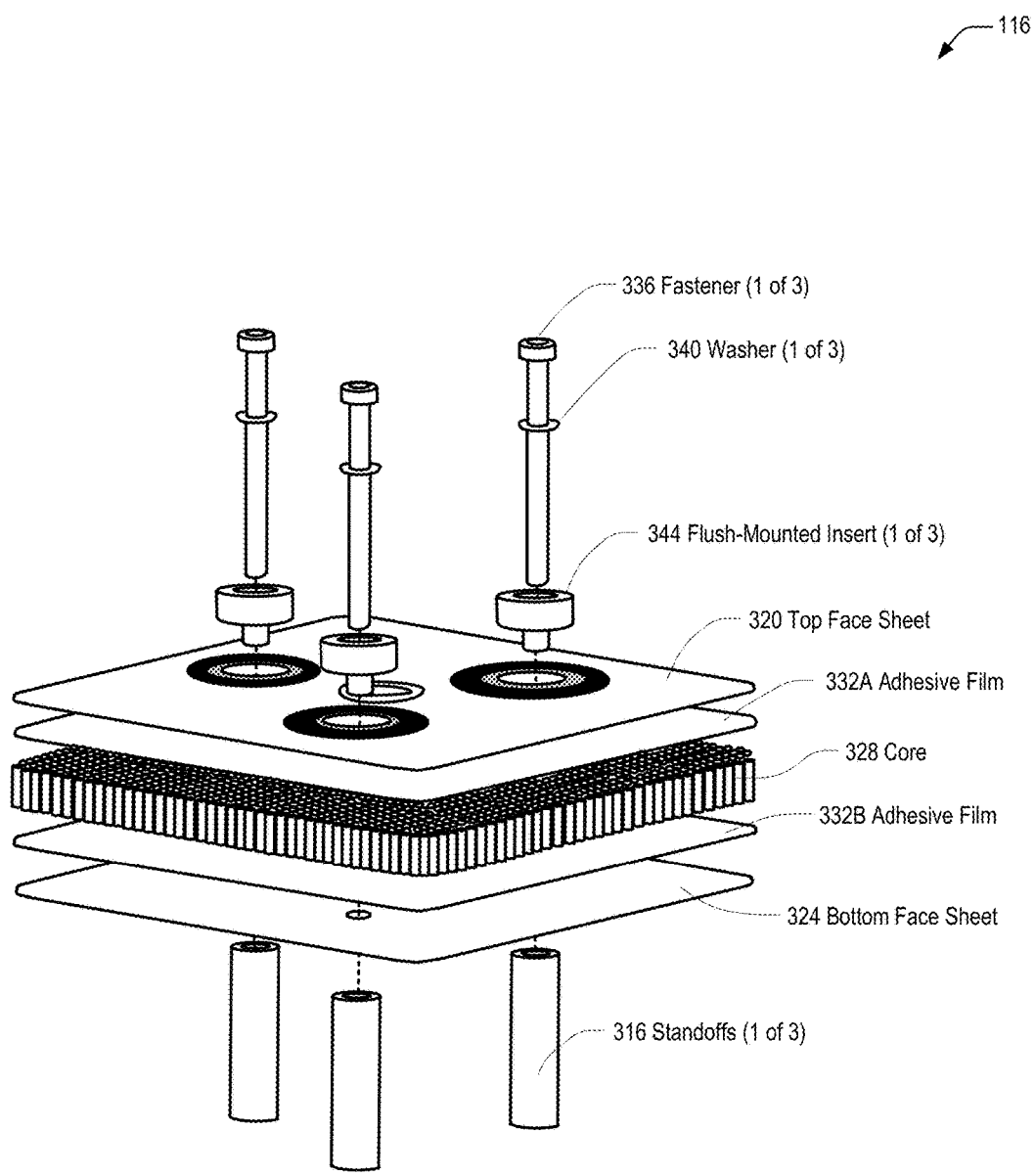

*Fig. 4 Alternative Standoffs and Fasteners*
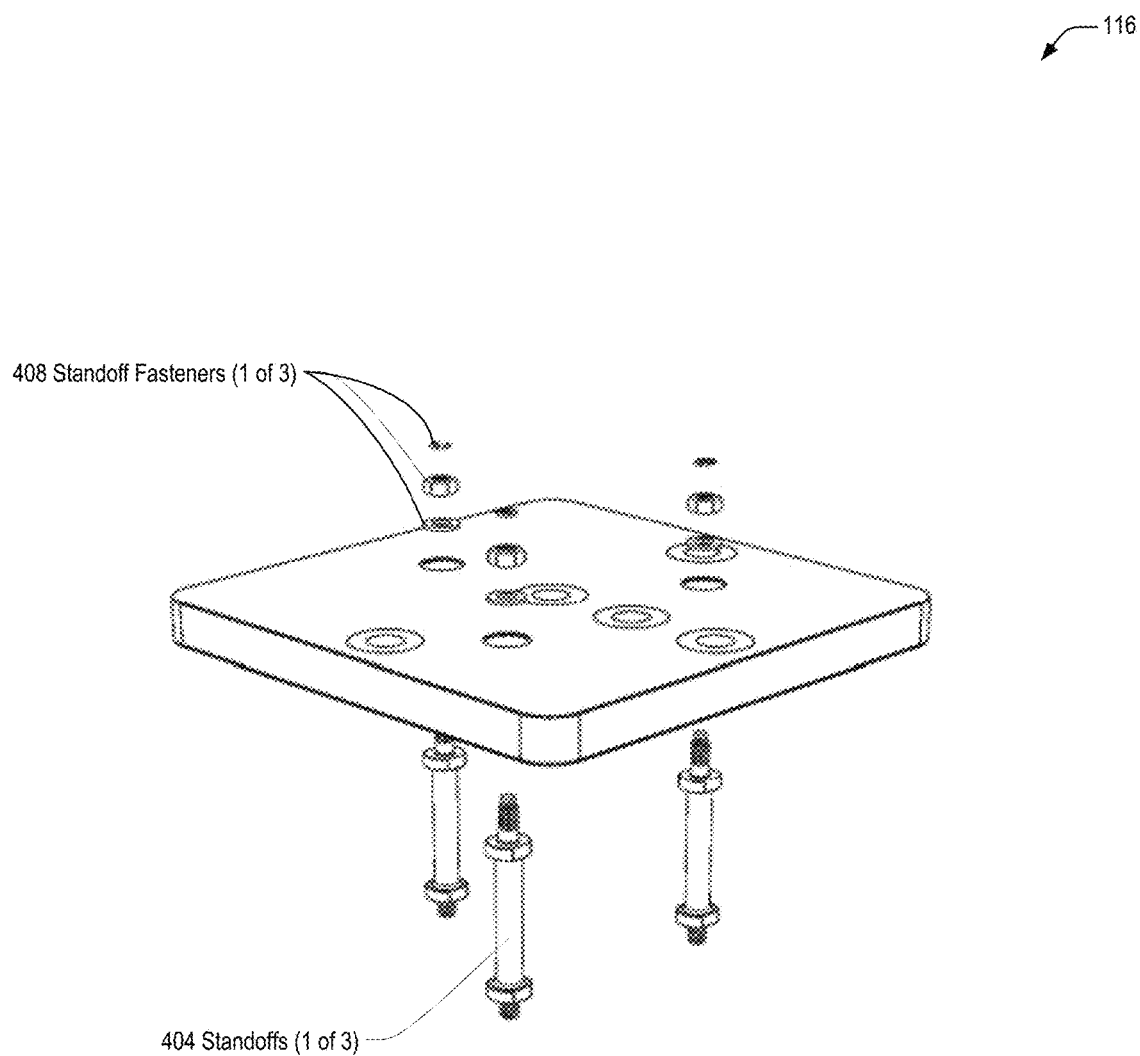

Fig. 5A  Capture Interface Orthogonal View
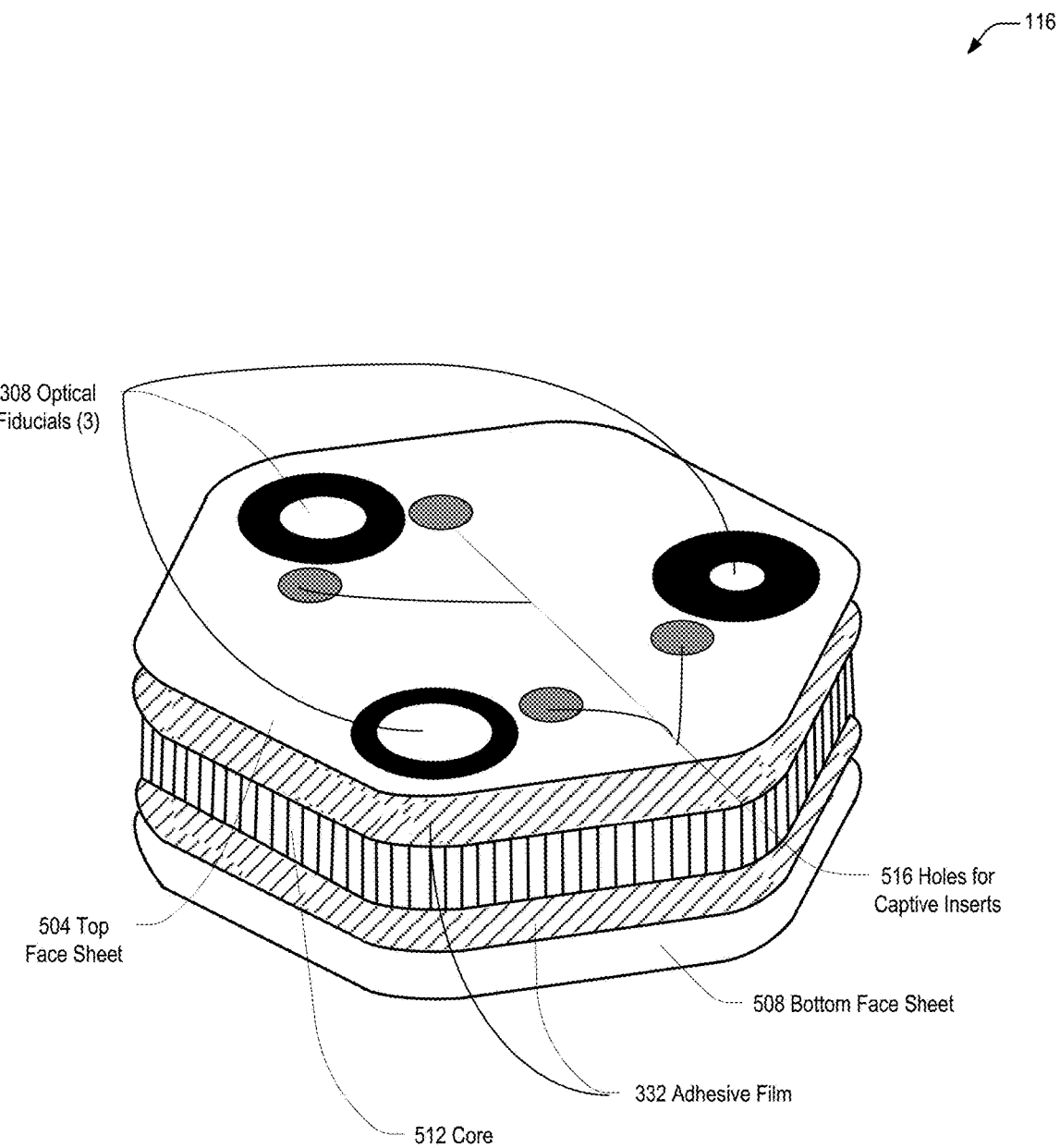

Fig. 5B  Capture Interface Inserts
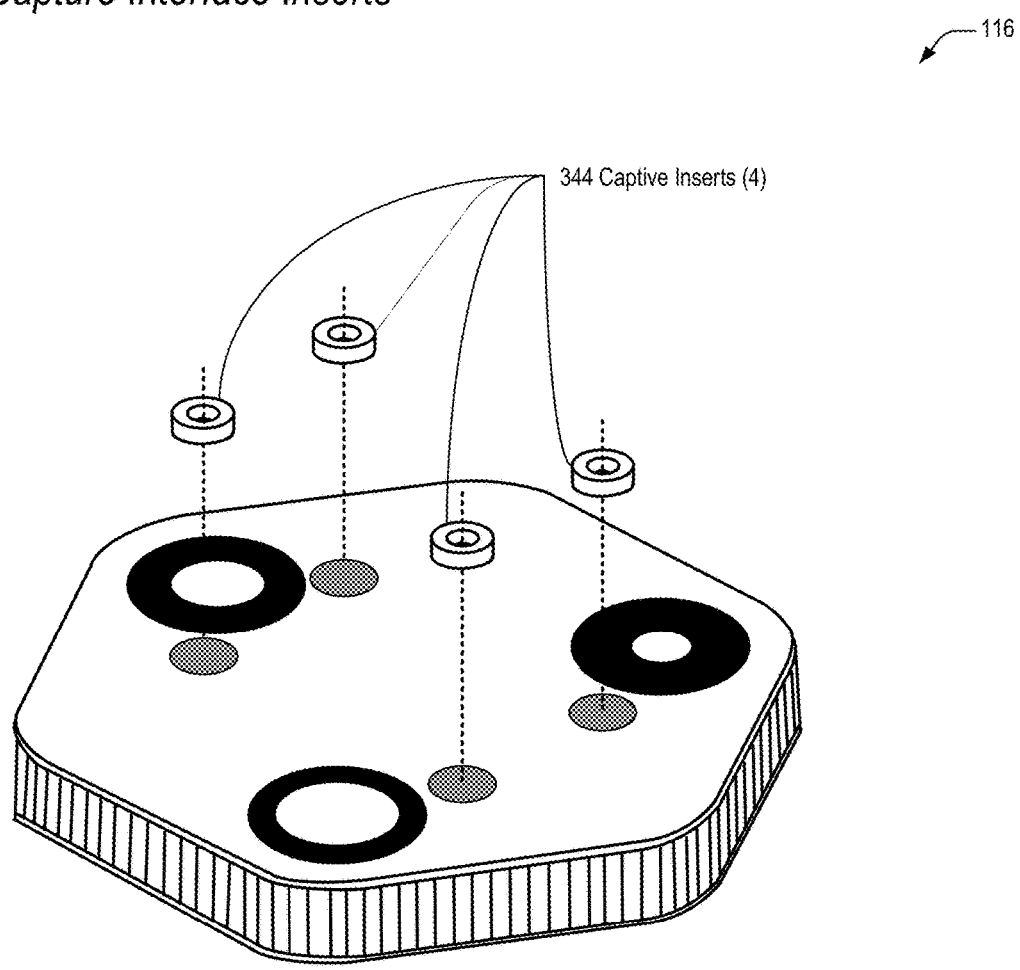

*Fig. 5C Capture Interface Installation*
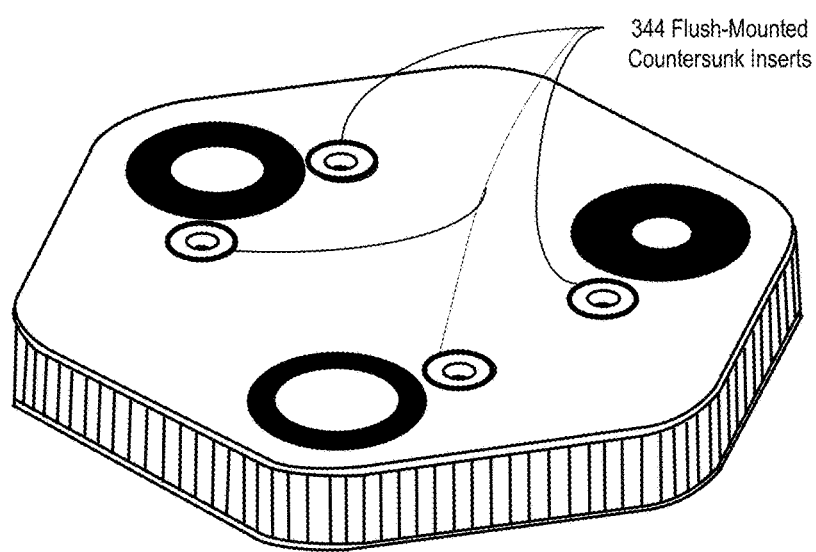

Fig. 6A  Capture Interface Orthogonal View
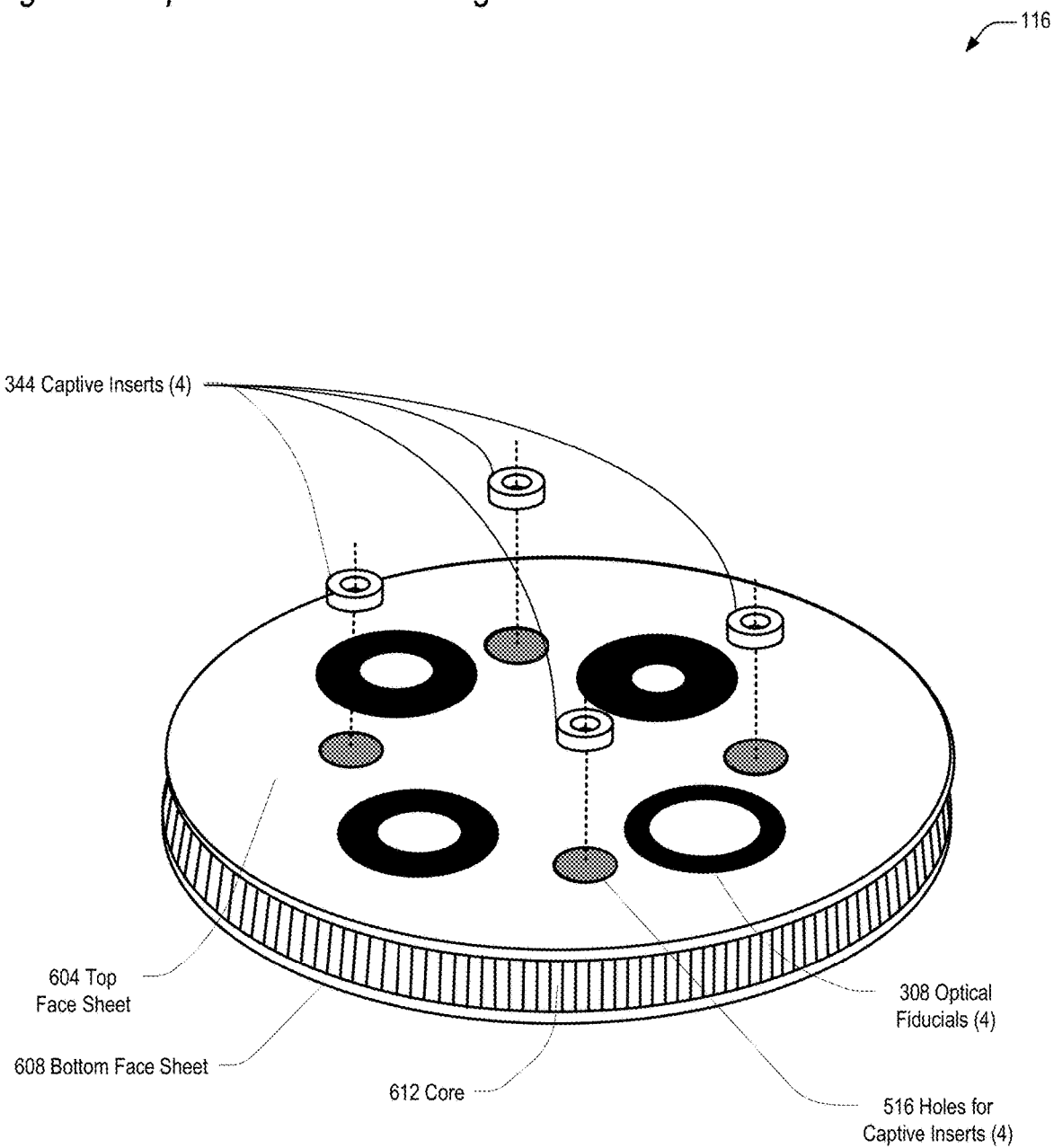

Fig. 6B  Capture Interface Installation
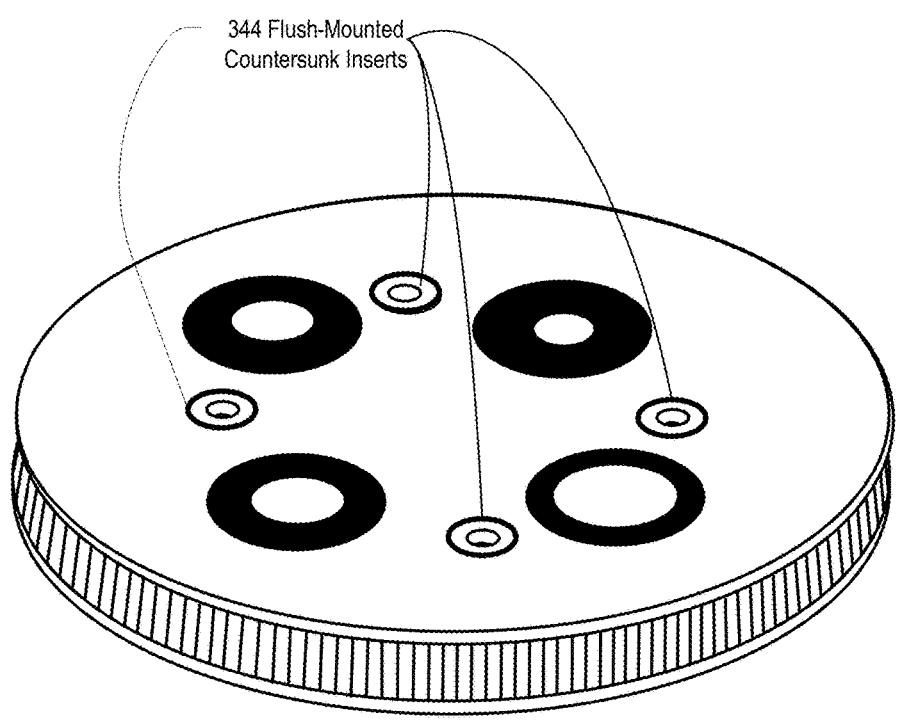

Fig. 7 Servicing Spacecraft Object Recovery process
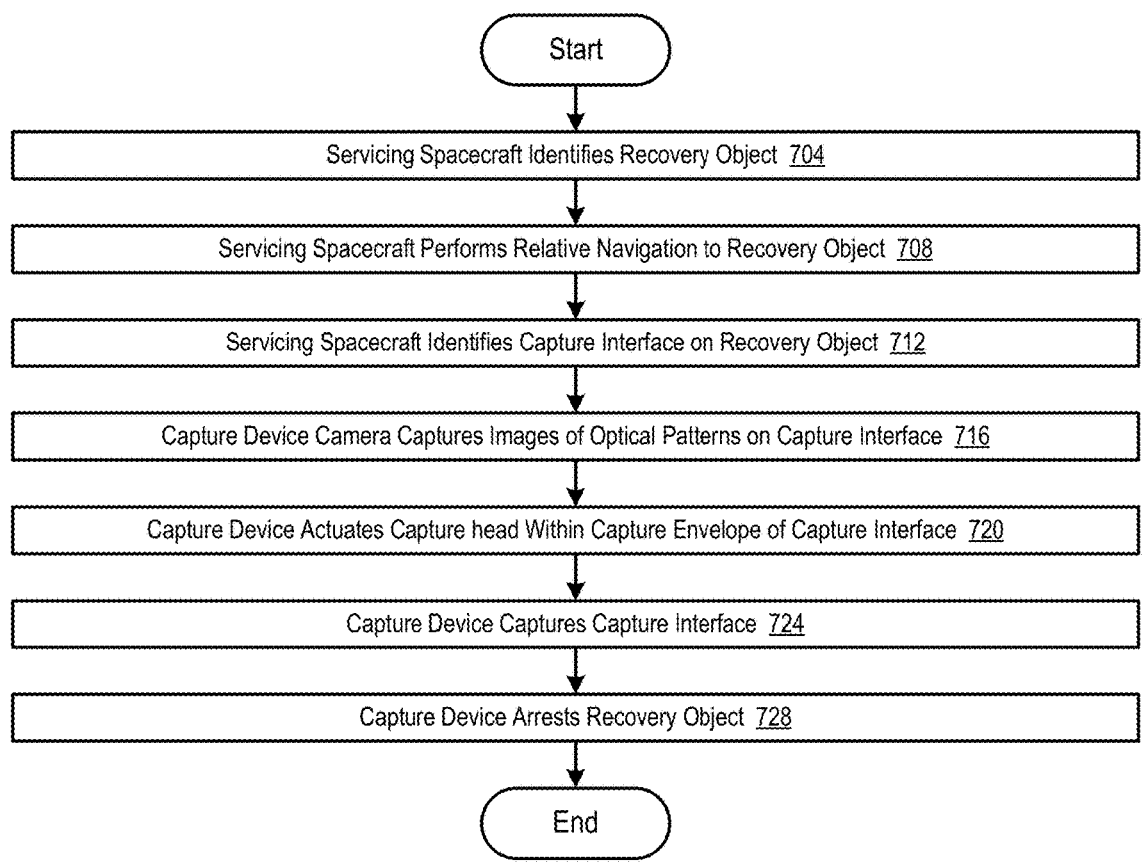

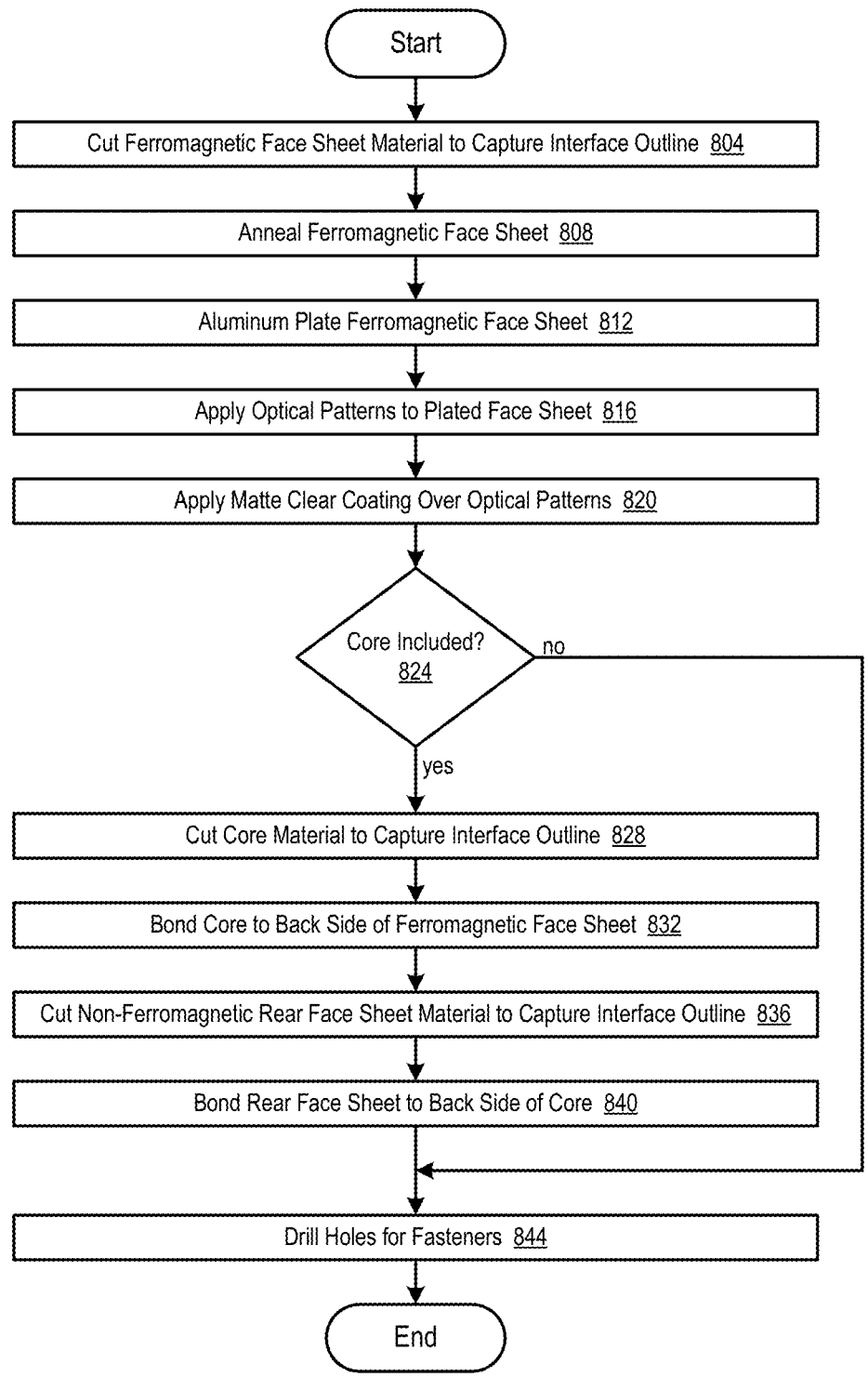
Fig. 8 Capture Interface Assembly Process

ROBOTIC CAPTURE INTERFACE

CROSS REFERENCE TO RELATED APPLICATIONS

This application claims priority from Provisional U.S. application 62/626,880, filed Feb. 6, 2018, entitled SPACECRAFT CAPTURE INTERFACE, which is hereby incorporated by reference for all purposes.

FIELD

The present invention is directed to object capture by spacecraft equipped with robotic manipulators and end effectors. In particular, the present invention is directed to methods and apparatuses for providing robotic capture interfaces.

BACKGROUND

Spacecraft can recover objects in space using one or more robotic arms. When the process involves recovering a delivery vehicle, it is typically called "berthing". Using a robot arm to recover a delivery vehicle and gently attach it to a space facility enables the use of lighter vehicle-to-vehicle connection mechanisms than is possible with traditional "docking" maneuvers, where the delivery vehicle directly connects with the spacecraft. In a scenario where a client satellite is beyond direct human vision, a grasping satellite or tug must be under the full control of a ground-based control center or have some fully or semi-autonomous control because the distance and communications delays typically prevent a directly human operated capture system. To grapple or capture a client satellite beyond direct vision, a system must exist for the grasping satellite to locate the client satellite, maneuver to the vicinity of the target, observe the client satellite, match any rotation that the client satellite may have, reach out with a robotic arm, grasp the client satellite, arrest its motion, and secure it to the tug.

Robotic arms have been in existence for several decades. Many industries utilize robotic arms to speed production, improve product assembly quality, and manipulate hazardous objects and materials. Most robotic arms in the world are designed for heavy, repetitive manufacturing work, and handle tasks that are difficult, dangerous, or boring to human beings. A typical robotic arm is controlled by a computer by activating individual step motors or actuators connected at each joint. At a minimum, a robotic arm has a single segment and a joint at each end. Robotic arms often use motion sensors to regulate movement in precise increments.

Current technology robotic arms utilize capture heads incorporating mechanical grippers, where mechanical force between two or more surfaces are used to positively capture and move objects. Mechanical grippers are suitable to capture known objects of predictable size, shape, and orientation, and having robust attachment surfaces.

SUMMARY

The present invention is directed to solving disadvantages of the prior art. In accordance with embodiments of the present invention, a capture interface is provided. The capture interface is configured to be rigidly affixed to an external surface of a recovery object and captured by a capture device. The capture interface includes a matte ferromagnetic surface of flat disposition and geometric outline, configured to facilitate capture by the capture device. The ferromagnetic surface includes a capture interface identifier.

In accordance with another embodiment of the present invention, a method is provided. The method includes one or more of forming a sheet of ferromagnetic material into a ferromagnetic surface, annealing the ferromagnetic surface, aluminum plating each side of the annealed ferromagnetic surface, applying one or more high contrast optical markings to a first side of the plated ferromagnetic surface symmetrically distributed about a center point of the plated ferromagnetic surface, and applying a matte clear protective coating over the aluminum plating and optical markings. The ferromagnetic surface is of a flat geometric outline.

An advantage of the present invention is that it provides a standard capture interface for various types of recovery objects. The recovery objects include, but are not limited to, any type of spacecraft, satellite, or stores or provisions. By providing a standard capture interface, a wider range of capture technologies may be utilized to capture, move, or release recovery objects.

Another advantage of the present invention is it allows a wide range of robotic capture technologies to be used to capture, move, or release client spacecraft or other recovery objects. Although optimized for magnetic capture using electro-permanent magnetic (EPM) technology, the capture interface may also be used in accordance with other types of magnetic grippers, mechanical grippers, electroadhesion, gecko adhesion, resettable adhesion, harpoon capture, snare capture, and other forms of capture technology.

Yet another advantage of the present invention is it is fully consumed on reentry of the earth's atmosphere. This provides a safety factor for people and property on Earth, and does not contribute to any such concerns that may be associated with a recovery object the capture interface may be affixed to.

Additional features and advantages of embodiments of the present invention will become more readily apparent from the following description, particularly when taken together with the accompanying drawings.

BRIEF DESCRIPTION OF THE DRAWINGS

FIG. 1 is a diagram illustrating a servicing spacecraft capture of a recovery object in accordance with embodiments of the present invention.

FIG. 2A is a diagram illustrating a servicing spacecraft and robotic manipulator in accordance with embodiments of the present invention.

FIG. 2B is a diagram illustrating a robotic manipulator in accordance with embodiments of the present invention.

FIG. 3A, a diagram illustrating a top view of a capture interface in accordance with a first embodiment of the present invention.

FIG. 3B is a diagram illustrating an orthogonal view of a capture interface in accordance with a first embodiment of the present invention.

FIG. 3C is a diagram illustrating an exploded orthogonal view of a capture interface in accordance with a first embodiment of the present invention.

FIG. 4 is an illustration depicting alternative standoffs and fasteners of a capture interface in accordance with embodiments of the present invention.

FIG. 5A is an illustration depicting an orthogonal view of a capture interface in accordance with a second embodiment of the present invention.

FIG. 5B is an illustration depicting capture interface inserts in accordance with a second embodiment of the present invention.

FIG. 5C is an illustration depicting a capture interface ready for installation in accordance with a second embodiment of the present invention.

FIG. 6A is an illustration depicting an orthogonal view of a capture interface in accordance with a third embodiment of the present invention.

FIG. 6B is an illustration depicting a capture interface ready for installation in accordance with a third embodiment of the present invention.

FIG. 7 is a flowchart illustrating a servicing spacecraft object recovery process in accordance with embodiments of the present invention.

FIG. 8 is a flowchart illustrating a capture interface assembly process in accordance with embodiments of the present invention.

DETAILED DESCRIPTION

After many years of DoD, NASA, and commercial investments in space robotics, in-space satellite servicing is finally beginning to gain acceptance as a new paradigm for space operations. Satellite servicing can enable space operators to extend the useful life of space assets, assemble dramatically larger space structures than can be realistically launched in one piece, accelerate the adoption of promising new technologies, and protect the space environment by enabling deorbit of failed spacecraft. However, while most satellite servicing efforts to-date have focused on servicing legacy satellites that were not explicitly designed to enable easy robotic interfacing, there is a new push to develop low-cost, lightweight, simple interfaces that make it easier to capture, manipulate, and refuel modularly-serviced spacecraft.

A key interface type is a grappling fixture that makes it easy to robotically connect a servicer spacecraft to a client spacecraft, even if the client spacecraft is disabled and potentially tumbling. Additionally, in order to maximize the benefit to client spacecraft, this grappling fixture should enable as many alternative methods of capture as possible. In situations where both sides of the interface (the grappling fixture and the capture interface) can be designed in advance, magnetic capture has many benefits, including the ability to exert attractive forces at non-negligible distance (>1 cm), the ability to resist large normal and shear forces and moments, and the ability to handle large relative linear and angular misalignments. However, there are also other promising capture approaches such as mechanical grasping, mechanical snares, resettable adhesives, and harpoon devices. Having a grappling fixture that can be grappled by a multiplicity of approaches maximizes the probability of a servicing provider being able to interface with a given space object.

Additionally, one of the key elements of future space exploration plans is the development of human-tended deep space habitats. These may serve as habitats during transfer from Earth to a destination (the Moon, Mars, etc), or serve as periodically-inhabited orbital bases, in locations such as Near Rectilinear Lunar orbits, or Low Mars Orbit. For all of these deep-space habitats, especially those left in orbit around a destination planet or Moon, astronaut time at the habitat will be both infrequent, and very valuable. As such, it would be extremely desirable to develop ways to enable robots to outfit the habitat prior to human occupation, and to allow robots to perform maintenance and logistics tasks both when humans are present and when they are not. While theoretically it may be possible to design robots to interact with a habitat designed without robotic interactions in mind, much as in the case of satellite servicing, the addition of some cooperative robotic interaction features to objects inside and outside a space habitat can dramatically simplify and improve the robustness of the robotic outfitting hardware. These robotic interaction aids ideally can serve three purposes: 1) helping robots determine their relative pose and position with respect to the client, and their relative location/pose inside or outside the habitat, 2) identifying what the objects are, especially if the objects are mobile like soft-goods bags, and 3) simplifying physical interactions with the object, including anchoring to and manipulating the object.

Space facilities often recover objects in space with one or more robotic arms, usually within direct visual distance of a robot operator. When the process involves recovering a delivery vehicle, it is typically called "berthing". Using a robot arm to recover a delivery vehicle and gently attach it to a servicing spacecraft enables the use of lighter vehicle-to-vehicle connection mechanisms than is possible with traditional "docking" maneuvers, where the delivery vehicle directly connects with the servicing spacecraft without the use of robotic manipulators.

In a scenario where a client satellite needing service is beyond direct human vision, the servicing satellite or tug must be under the full control of a ground-based control center or have some fully or semi-autonomous control because the distance and communications delays typically prevent a directly human operated capture system. To grapple or capture a satellite beyond direct vision, a system must exist for the servicing spacecraft to locate the destination satellite, maneuver to the vicinity of the satellite, observe the satellite, match any rotation that the satellite may have, reach out with a robotic manipulator, grasp the satellite, arrest its motion and secure it to the servicing spacecraft.

To enable capture-oriented robotic interactions, a lightweight, low-cost, passive robotic capture interface is described herein that can be attached to a client satellite main structure or various habitat structures and objects. The objects may include, but are not limited to, crewed and uncrewed spacecraft, payloads, stores, tools, materials, and assemblies. The objects may have a regular or irregular overall shape, size, and features, and may have one or multiple robotic capture interfaces at various locations. For large or very large objects, multiple robotic capture interfaces may allow object capture and arrested movement to be performed at various points distributed on external surfaces of the object.

As a servicing spacecraft approaches a client satellite or object, or as a servicing robot approaches an item within or outside a space facility, there may exist a relative velocity, a positive or negative acceleration, and/or a changing orientation. The changing orientation may be represented as any combination of roll, pitch, and/or yaw, and may or may not be combined with an object velocity and/or positive or negative acceleration.

In one embodiment, a robotic manipulator with a capture head being compatible with the capture interface captures an object in contact with the capture interface. In another embodiment, a robotic manipulator with a capture head being compatible with the capture interface imparts a velocity to an object attached to the capture interface just prior to or during release of the capture interface. Thus, the capture interface may be utilized to capture an object, control (move) an object, release an object, or impart a velocity to an object.

Referring now to FIG. 1, a diagram illustrating a servicing spacecraft 104 capture of a recovery object 112 in accordance with embodiments of the present invention is shown. The servicing spacecraft 104 may be a manned or unmanned servicing spacecraft 104, and generally includes a form of active propulsion such as one or more thrusters or engines. The one or more thrusters or engines allow the servicing spacecraft 104 to move in any direction with a velocity and/or a positive (i.e. increasing) or negative (i.e. decreasing) acceleration.

The servicing spacecraft 104 includes one or more robotic manipulator 108, which are able to capture recovery objects 112 as previously described. The one or more robotic manipulator 108 may be distributed symmetrically or asymmetrically to exterior surfaces of the servicing spacecraft 104, and in some embodiments may be capable of capturing multiple similar or different recovery objects 112 simultaneously.

Robotic manipulator 108 may capture, move, release, or impart a velocity to a recovery object 112 through interaction with one or more capture interfaces 116. The one or more capture interfaces 116 are on accessible exterior surface(s) of the recovery object 112. The recovery object 112 may or may not be presently capable of self-movement, and may have one or more active or inactive thrusters or engines. In the illustrated embodiment, the recovery object 112 is an inactive or out-of-service spacecraft having an engine and several thrusters. However, it should be understood the recovery object 112 may never have been capable of self-movement and may be inert or a completely passive object. The one or more capture interfaces 116 are securely mounted to the recovery object 112 such that movement forces applied by the robotic manipulator 108 to the one or more capture interfaces 116 will translate to equivalent movement forces applied to the recovery object 112, and the one or more capture interfaces 116 do not separate from the recovery object 112 under specified capture, movement, and release (including down mass) forces.

In a scenario where a target satellite is beyond direct human vision, a grasping satellite or tug must be under the full control of a ground-based control center or have some fully or semi-autonomous control because the distance and communications delays typically prevent a directly human operated capture system. To grapple or capture a satellite beyond direct vision, a system must exist for the grasping satellite to locate the client satellite, maneuver to the vicinity of the client satellite, observe the client satellite, match any rotation that the client satellite may have, reach out with a robotic manipulator, grasp the client satellite, arrest its motion, and secure it to the tug. When a recovery object 112 is beyond visual range, a human operator must rely on non-direct feedback (i.e., sensors). Communication delays between the operator and the tug/target could be significant enough so that the capture operation is conducted in a series of semi or fully automated steps.

Placement location(s) of the capture interface(s) 116 on the recovery object 112 may be determined by one or more of magnetic compatibility, a recovery object 112 center of mass, an internal configuration of the recovery object 112, and a desire to minimize collision risk with appendages associated with the recovery object 112 or a capture device.

Referring now to FIG. 2A, a diagram illustrating a servicing spacecraft and robotic manipulator in accordance with embodiments of the present invention is shown. The servicing spacecraft 104 may be a manned or unmanned spacecraft. In the illustrated embodiment, the servicing spacecraft 104 may include one or more solar panels for electrical power generation. The servicing spacecraft 104 includes one or more robotic manipulators 108 capable of arresting, moving, or releasing recovery objects 112.

Referring now to FIG. 2B, a diagram illustrating a robotic manipulator 108 in accordance with embodiments of the present invention is shown. Robotic manipulators 108 may include one or more manipulator segments 204 that may be articulated or actuated by one or more manipulator deployers (not shown). In the embodiment illustrated, there are two manipulator segments 204 included in robotic manipulator 108, identified as manipulator segment 204A and manipulator segment 204B. However, there may be any number of manipulator segments 204 in robotic manipulator 108.

The robotic manipulator 108 is defined by a manipulator fixed end 208A and a manipulator free end 208B. The manipulator fixed end 208A is rigidly attached to an exterior surface of the servicing spacecraft 104, while the manipulator free end 208A is attached to a capture head 212. In most embodiments, the manipulator free end 208B is articulated to move in any direction to move the capture head 212 relative to the manipulator fixed end 208A up to the available length of the robotic manipulator 108. In some embodiments, one or more manipulator segments 204 may be capable of being extended or retracted through telescoping or other means in order to adjust the reach of the robotic manipulator 108.

The robotic manipulator 108 is directly controlled by a control apparatus 216. The control apparatus 216 may include one or more computers, sensors, and communication devices. The computers may control actuators of various types to move the manipulator segments 204 and the capture head 212. In some embodiments, the control apparatus 216 may also control various aspects of the control head 212 to articulate the control head 212 relative to a recovery object 112 and capture interface 116 and/or capture or release a capture interface 116 coupled to the recovery object 112. Such articulation may prepare the capture head 212 for a capture or release operation by activating or inactivating a magnet, orienting the capture head 212 relative to an orientation of a capture interface 116, or activating/inactivating various sensors or control surfaces within the capture head 212.

The capture head 212 itself may include any of several technologies to make contact with the capture interface 116 and capture/move/release the recovery object 112. In the preferred embodiment, the capture head 212 utilizes a controllable magnetic technology to provide a secure gripping force with the capture interface 116. An example of a controllable magnetic technology is EPM (Electro-Permanent Magnet), developed by Altius Space Machines Inc. of Broomfield, Colo. Many other technologies may be suitable for capture interface 116 gripping by the capture head 212—including but not limited to mechanical gripping, gecko adhesion, resettable adhesion, electroadhesion, snare capture, harpoon capture, etc.

It is generally desirable for capture between the capture device and the capture interface 116 to be completed within approximately a five second period. If a spacecraft has lost control, it may begin to tumble about an unpredictable axis. Below a certain amount of rotation, current technologies are able to observe the rotation, calculate a plan to reach in to the capture interface 116 while it clear of obstructions, make the connection, and arrest movement of the recovery object 112 without damaging the recovery object 112. The chances of colliding with a part of the recovery object 112 may increase as time to grasp the object increases.

In most embodiments, the robotic manipulator 108 includes one or more sensors to identify the recovery object 112 or capture interfaces 116, determine position and/or orientation of the various manipulator segments 204 and the capture head 212, determine velocity and/or acceleration of the recovery object 112 and/or capture interfaces 116, and/or determine orientation (i.e., roll, pitch, yaw) of the recovery object 112 and/or capture interfaces 116. In one embodiment, one or more sensors are located on the capture head 212. In one embodiment, one or more sensors are located on one or more manipulator segments 204. In one embodiment, one or more sensors are located on one or more of the manipulator fixed end 208A and/or manipulator free end 208B. In one embodiment, one or more sensors are located on one or more exterior surfaces of the servicing spacecraft 104.

The control apparatus 216 of the robotic manipulator 108 may include one or more communication interfaces. The communication interfaces may transmit or receive data to or from one or more sensors associated with the robotic manipulator 108, the recovery object 112, space facilities, or remote control facilities for the remote manipulator 108.

A capture device is an apparatus that captures a captive interface 116, and may be interpreted to include any of the capture head 212, the capture head 212 and the robotic manipulator 108, one or more cameras 220 or other sensors, the servicing spacecraft 104, and the control apparatus 216.

Referring now to FIG. 3A, a diagram illustrating a top view of a capture interface 116 in accordance with a first embodiment of the present invention is shown. The first embodiment of the capture interface 116 provides a flat square outline. It is important that the front surface or front face sheet be flat, regardless of outline shape, in order to minimize an air gap between certain types of capture heads 212 (e.g., magnetic or EPM). The presence of an air gap may result in reduced gripping force in response to peel forces. The mass of the capture interface 116 is determined by the manufacturer of the recovery object 112. However, in one embodiment, the maximum mass of the capture interface 116 is 235 grams (~0.5 lbs).

In the top view, three different optical fiducials 308 are shown, oriented symmetrically about a center point 312 of the top surface 304. The optical fiducials 308 are easily recognizable by machine vision sensors, eliminating the need for complex recognition software or LIDAR systems. LIDAR, also sometimes referred to as 3D laser scanning, is a surveying method that measures distance to a target by illuminating the target with pulsed laser light and measuring the reflected pulses with a sensor. Differences in laser return times and wavelengths can then be used to make digital 3D representations of the target. The name LIDAR, now used as an acronym of light detection and ranging (sometimes light imaging, detection, and ranging), is a special combination of a 3D scanning and laser scanning with terrestrial, airborne, and mobile applications. The use of optical fiducials 308 allows a machine vision system associated with the servicing spacecraft 104 to accurately determine range, velocity, acceleration, pose, and orientation of the recovery object 112, and specifically one or more of the capture interfaces 116. The current (and possibly changing) range, velocity, acceleration, and orientation of the recovery object 112 allows the servicing spacecraft 104 or control apparatus 216 to determine how the robotic manipulator 108 and capture head 212 should be manipulated in order to capture, move, or release the capture interface 116 and recovery object 112. The fiducials 308 in most embodiments have a consistent shape, and in one embodiment may be circular and of a darker non-reflective appearance than the background on the capture interface 116. In other embodiments, fiducials 308 may be a single geometric or non-geometric shape, instead of concentric rings or boxes. In some embodiments a number of fiducials 308 of the same size can be arranged in a non rotationally-symmetric pattern.

Fiducials 308 allow for capture recognition and position at various ranges. For example, fiducials 308 may be recognized at over 20 meters for a habitat capture interface 116 within the International Space Station, at 5 meters or less by machine vision, at 3 meters or less for relative position determined by machine vision, and up to 1 m distance for RFID/barcode etc recognition. The primary feature of a fiducial 308 is that it is relatively easy for a computer system to recognize the fiducial 308 and to calculate needed information from the position and pose of the fiducial 308. Fiducials 308 on a capture interface 116 may be symmetrically or asymmetrically arranged around a center point of the capture interface 116. The typical dimensions of a capture interface 116 may be, regardless of outline, 204 millimeters×150 millimeters×126 millimeters. In other embodiments, the capture interface 116 may have different dimensions, and there are no maximum dimensions for the capture interface 116.

Referring now to FIG. 3B, a diagram illustrating an orthogonal view of a capture interface 116 in accordance with a first embodiment of the present invention is shown. FIG. 3B illustrates the capture interface 116, when viewed orthogonally, in order to show standoffs attached to a bottom surface of the capture interface 116. The standoffs 316 position the capture interface 116 a distance above an exterior surface of a recovery object 112 the capture interface 116 is affixed to. The length of the standoffs may be specified by a servicing spacecraft 104 manufacturer, and may or may not be related to intended means of capture. At least three standoffs 316 are required in order to provide required rigidity of the capture interface 116 in all force planes. It should be understood that use of standoffs 316 may be considered as optional when certain types of gripping technologies are exclusively utilized, such as magnetic, electroadhesion, resettable adhesion, and gecko adhesion. However, support for other types of capture or gripping technologies, such as harpoon capture, mechanical pinch grasping, or snare capture, may require suitable standoffs 316 to be used.

Referring now to FIG. 3C, a diagram illustrating an exploded orthogonal view of a capture interface 116 in accordance with a first embodiment of the present invention is shown. FIG. 3C shows the various components of a representative capture interface 116. The capture interface 116 is preferably fabricated as a sandwich of layers that provide sufficient depth for mechanical grabbing operations while providing strength to resist deformation from impacts, capture, movement, torque forces, and mismatch of roll/pitch/yaw between the servicing spacecraft 104 and the recovery object 112. The capture interface 116 may include a metal honeycomb sandwich panel mounted to a grapple fixture bolt hold interface via three or more standoffs 316. In the preferred embodiment, the standoffs 316 are made from 6061 aluminum for low weight and sufficient strength. However, the standoffs 316 may be constructed from other materials having equivalent or greater strength and mechanical properties to aluminum.

The top surface 304 (i.e. facing away from the recovery object 112) includes a top face sheet 320. The top face sheet 320 includes a thin (<0.4 mm) ferromagnetic material layer (Hiperco-50) that allows robotic manipulators 108 to magnetically grip the capture interface 116. The ferromagnetic material layer 320 includes a soft magnetic material with a high permeability, high saturation magnetization, and low coercive force. These properties enable robust magnetic capture with a high holding force while ensuring that the capture interface 116 has a low residual magnetic field that doesn't interfere with components of other servicing spacecraft 104 or constellation owners. The coercive force affects torque created by the Earth's magnetic field, but the larger the spacecraft the more torque it takes to induce a given angular acceleration. Other items on a spacecraft may induce magnetic dipoles (e.g., ferrous material in magnetorquers or hall thrusters, current loops caused by how the electronics and harnessing are designed, etc), so generally it is preferred to maintain the worst-case residual dipole of the capture interface 116 down in the same level or lower than the other residual dipole sources.

The capture interface 116 is similar in construction to sandwich panels on various spacecraft, but with the outer face sheet replaced by an aluminized Hiperco-50 face sheet 320. Hiperco-50 is a magnetically soft ferrous alloy with very high saturation flux density, enabling strong magnetic gripping forces, and an extremely low coercivity. The panel retains very little residual magnetization when not subjected to an external magnetic field, which minimizes magnetic interference. The top face sheet 320 includes 1100 aluminum cladding on each side of the Hiperco-50 layer—that enables easier bonding into the capture interface 116 sandwich, enables protecting the Hiperco-50 layer from corrosion, and enables the high-contrast optical fiducial 308 pattern to be printed and sealed-into the anodized outer surface of the face sheet 320, thus providing an extremely durable and fade-resistant marking. In one embodiment, the flatness of the face sheet 320 is approximately +/−0.001" per linear foot.

The top face sheet 320 may be manufactured by laser cutting the Hiperco-50 material to the correct shape, cold-spraying a 75 μm 1100 aluminum coating (i.e. cladding) onto both sides, alodyning one side of the face sheet 320, anodizing/pixodyzing the fiducial markings 308 onto the outside of the face sheet 320, and then sealing the anodization. In another embodiment, the aluminum coating can be applied via electroplating. In another embodiment, the aluminized Hiperco-50 could be replaced by a more corrosion-resistant soft magnetic alloy such as Carpenter High Permeability 49 alloy, which would not require aluminum plating. Carpenter High Permeability 49 alloy could be either aluminum plated and anodized/pixodized, or the fiducials 308 could potentially be marked into the surface using laser etching.

By requiring the top face sheet 320 to have a ferromagnetic material layer, the capture interface 116 advantageously allows electro-permanent magnetic (EPM) grippers to be used with the capture head 212, which uses an electrically switched permanent magnet with no moving parts to enable secure attachment to and release from the capture interface 116. Magnetic capture is a favorable capture approach for tumbling spacecraft since a magnetic gripper head 212 may attract a capture interface 116 at a distance. This reduces the complexity of the rendezvous and capture system as well as the time required for capture operations.

In one embodiment, the top face sheet 320 may include durable long-range optical fiducials 308 printed and sealed into the capture interface 116 anodized aluminum surface. In another embodiment, durable long-range optical fiducials 308 may be painted onto the anodized aluminum surface of the top face sheet 320. In yet another embodiment, the anodized aluminum surface of the top face sheet 320 may be painted with a light color matte background finish (or a light color decal applied), and the optical fiducials 308 may be painted (or a decal) over the background color. The optical fiducials 308 allow the servicing spacecraft 104 and/or control apparatus 216 to determine relative pose and position of the recovery object 112. In some embodiments, the top face sheet 320 also includes an identification code, an optical pattern (such as a quick response (QR) code, and possibly an RFID tag (radio frequency ID) printed and sealed into the top surface 304 for identifying the recovery object 112.

The capture interface 116 also includes a bottom face sheet 324. In one embodiment, the bottom face sheet 324 is preferably cut from a 6061 aluminum sheet, but other materials with equivalent or greater strength and stiffness may be substituted. A typical thickness of 0.4-0.5 mm may be used. In another embodiment, another material "AlSiC"—an aluminum/silicon carbide metal matrix composite—may be used. By varying the amount of SiC reinforcement mixed into the aluminum matrix, the coefficient of thermal expansion of the material may be the same as Hiperco-50. Without this, flexing in the panel may result as it heats up and cools down (because the Hiperco-50 and the back sheet will expand/contract at different rates if the coefficients of thermal expansion are not matched).

The capture interface 116 may include a core 328 of predetermined thickness and similar geometric outline as the top face sheet 320 and the bottom face sheet 324, which adds strength and rigidity to the sandwich construction. In the preferred embodiment, the core is cut from a 3/16 inch thick sheet of 5056-0.0007p aluminum honeycomb material, but other materials with equivalent or greater strength and stiffness may be substituted. The honeycomb construction provides great strength for weight while providing a useful thickness when mechanical grippers are used with the capture head 212.

The capture interface 116 construction utilizes two sheets of adhesive film 332 in order to bond the top face sheet 320, the core 328, and the bottom face sheet 324 together. Adhesive film layer 332A permanently bonds the top face sheet 320 to a top side of the core 328, while adhesive film layer 332B permanently bonds the bottom face sheet 324 to a bottom side of the core 328. The adhesive film 332 in the preferred embodiment is a suitable space-rated adhesive, while other suitable adhesive films may be substituted.

In order to attach the capture interface 116 to the recovery object 112, mounting hardware is required. In the preferred embodiment, three of each fasteners 336, washers 340, flush-mounted inserts 344, and standoffs 316 are required. The fasteners 336 are preferably 70 mm M5 ISO 4762 Stainless Steel Socket Head Cap Screw (SHCS—SS), although other similar fasteners 336 with equivalent or greater strength may be substituted. The washers 340 are preferably ISO 7089 Stainless Steel washers, although other similar washers 340 with equivalent or greater strength may be substituted. The flush-mounted inserts 344 are preferably M5 Counter Bore GreDom Inserts constructed of 6061 Aluminum, although other similar flush-mounted inserts 344 with equivalent or greater strength may be substituted.

In some embodiments, the capture interface 116, regardless of shape, outline, or standoffs 316—is required to be electrically conductive in order to eliminate static charge buildup and prevent damage to electronics associated with the recovery object 112, servicing spacecraft 104, control apparatus 216, capture head 212, cameras 220, or any other component involved with the capture, movement, or release of a recovery object 112 through a capture interface 116. In other embodiments, the capture interface 116 is required to not be electrically conductive. The capture interface 116, including the top face sheet, core, bottom face sheet, standoffs 316, and fasteners 336 are also required to completely disintegrate upon atmospheric reentry—regardless of the size, mass, and outline of the capture interface 116.

Referring now to FIG. 4, an illustration depicting an orthogonal view of a capture interface 116 with alternative standoffs and fasteners in accordance with a embodiments of the present invention is shown.

In an alternative fastener embodiment of FIG. 4, the conventional standoffs 316 may be replaced with aluminum machined standoffs 404 that have male M5 threads on both ends, and shoulders with machined wrench flats on both ends. One end of the machined standoffs 404 would thread into threaded inserts on the recovery object 112, and the other end would protrude into counterbored inserts in the capture interface 116. This allows a capture interface 116 to be attached to the threaded standoffs 404 using stainless steel washers and nuts 408, potentially with the use of an e-clip to retain the nut and washer on each stud prior to installation onto the recovery object 112. This form of installation allows the capture interface 116 to be delivered as one pre-assembled piece that could still allow the standoffs 404 to be tightened to the recovery object 112 before tightening the capture interface 116 to the standoffs 404 using the fasteners 408.

Referring now to FIG. 5A, a diagram illustrating an orthogonal view of a capture interface 116 in accordance with a second embodiment of the present invention is shown. The second embodiment of the capture interface 116 features a flat hexagonal outline as shown. In one embodiment, three optical patterns or fiducials 308 are used on the top face sheet 504, although in other embodiments less or more than three optical fiducials 308 may be used.

FIG. 5A shows the capture interface 116 of the second embodiment in an expanded form for easier view of each of the layers used in the representative construction. In addition to the top or ferromagnetic face sheet 504, the capture interface 116 may include a core 512 and a rear or bottom face sheet 508. The core 512 is of predetermined thickness and similar geometric outline as the top face sheet 504 and the bottom face sheet 508. Sheets of adhesive film 332 may bond the core 512 to the top face sheet 504 and the bottom face sheet 508. Use of the core 512 and the bottom face sheet 508 may advantageously help to make the capture interface 116 stiffer or more rigid and better able to resist impact damage or deformation.

Referring now to FIG. 5B, an illustration depicting capture interface inserts 344 in accordance with a second embodiment of the present invention is shown. In the preferred embodiment, the capture interface 116 utilizes three or more captive inserts 344 (four illustrated) recessed in holes 516 in order to provide strong attachment points for the fasteners 336 (not shown). It should be understood that such capture interface inserts 344 represent one of many suitable components for securely mounting the capture interface 116 to the recovery object 112, and alternative means of securing the capture interface 116 are contemplated by the present invention.

Referring now to FIG. 5C, an illustration depicting a capture interface 116 ready for installation in accordance with a second embodiment of the present invention is shown. In the embodiment illustrated, the capture inserts 344 are flush-mounted to the top surface of the capture interface 116. Flush mounting is desirable so that the fasteners 336 and associated mounting hardware do not interfere with capture devices.

Referring now to FIG. 6A, an illustration depicting an orthogonal view of a capture interface 116 in accordance with a third embodiment of the present invention is shown. The third embodiment of the capture interface 116 represents the preferred embodiment, and features a flat circular outline as shown. A circular outline is preferred since by nature it maximizes the capture area for a given capture interface 116 outline and allows the most off-center alignment for capture compared to other outline shapes. A diameter of approximately 18" is suitable to include most satellites. In the illustrated embodiment, four optical patterns or fiducials 308 are used on the top face sheet 604.

FIG. 6A shows the layers used in the representative construction for the capture interface 116 of the third embodiment. In addition to the top or ferromagnetic face sheet 604, the capture interface 116 may include a core 612 and a rear or bottom face sheet 608. The core 612 is of predetermined thickness and similar geometric outline as the top face sheet 604 and the bottom face sheet 608. Sheets of adhesive film 332 (not shown) may bond the core 612 to the top face sheet 604 and the bottom face sheet 608. Use of the core 612 and the bottom face sheet 608 may advantageously help to make the capture interface 116 stiffer or more rigid and better able to resist impact damage or deformation.

In the preferred embodiment, the capture interface 116 utilizes three or more captive inserts 344 (four illustrated) recessed in holes 516 in order to provide strong attachment points for the fasteners 336 (not shown). It should be understood that such capture interface inserts 344 represent one of many suitable components for securely mounting the capture interface 116 to the recovery object 112, and alternative means of securing the capture interface 116 are contemplated by the present invention.

Referring now to FIG. 6B, an illustration depicting a capture interface 116 ready for installation in accordance with a third embodiment of the present invention is shown. In the embodiment illustrated, the capture inserts 344 are flush-mounted to the top surface of the capture interface 116. Flush mounting is desirable so that the fasteners 336 and associated mounting hardware do not interfere with capture devices.

Referring now to FIG. 7, a flowchart illustrating a servicing spacecraft object recovery process in accordance with embodiments of the present invention is shown. Flow begins at block 704.

At block 704, a servicing spacecraft 104 identifies a recovery object 112. The servicing spacecraft 104 may be distant to the recovery object 112, or in close proximity to the recovery object 112. Flow proceeds to block 708.

At block 708, the servicing spacecraft 104 performs relative navigation maneuvers in order to approach the recovery object 112, if the servicing spacecraft 104 is not already close to the recovery object 112. At this step, the servicing spacecraft 104 is concerned with propulsion maneuvers to place the servicing spacecraft 104 in proximity to the recovery object 112, with matched velocity and acceleration. Flow proceeds to block 712.

At block 712, the servicing spacecraft 104 identifies a capture interface 116 on the recovery object 112. A recovery object 112 may have any number of capture interfaces 116 on exterior surfaces of the recovery object 112, and a specific capture interface 116 is identified by the servicing spacecraft 104. Flow proceeds to block 716.

At block 716, a capture device camera 220 captures one or more images of optical patterns on the identified capture interface 116. Depending on the size and change in appearance over time for each of the optical patterns on the capture interface 116, the servicing spacecraft 104 or capture device is able to determine instantaneous distance to each of the optical patterns, instantaneous orientation or change in pitch, roll, and yaw, and pose (angular displacement) of the capture interface 116. Based on the instantaneous and change readings, the servicing spacecraft 104 or capture device can determine the complete movement behavior of the recovery object 112, and more importantly, the identified capture interface 116. Flow proceeds to block 720.

At block 720, the capture device actuates a capture head 212 within a capture envelope of the capture interface 116. The capture envelope is determined by many factors, including but not limited to distance to the identified capture interface 116, length and articulation of the robotic manipulator 108, roll/pitch/yaw of the recovery object 112, and size and dimensions of the capture interface 116. A robotic manipulator 108 includes various actuators, and is articulated to move in such a fashion as to move the capture head 212 in proximity to the identified capture interface 116. The position, pose, and orientation data determined in block 716 allows the servicing spacecraft 104 or capture device to accurately track and predict movement of the identified capture interface 116, and how to most efficiently intercept it for capture with the robotic manipulator 108 and capture head 212. Flow proceeds to block 724.

At block 724, the capture device (specifically, the capture head 212 of the capture device) captures the identified capture interface 116 on the recovery object 112. The capture head 212 is in direct contact with the capture interface 116 and is maintaining a secure grasp of the identified capture interface 116 and the recovery object 112. Flow proceeds to block 728.

At block 728, now with a secure grasp, the capture device arrests motion of the recovery object 112. Although relative navigation may have removed most of the relative motion between the servicing spacecraft 104 and the recovery object 112, in most cases there is still some motion between the servicing spacecraft 104 and the recovery object 112. The capture device therefore controls the robotic manipulator 108 to arrest any remaining motion. With the recovery object 112 now in full control of the servicing spacecraft 104, the servicing spacecraft 104 may move, reposition, throw, release, or launch the recovery object 112. Flow ends at block 728.

Referring now to FIG. 8, a flowchart illustrating a capture interface assembly process in accordance with embodiments of the present invention is shown. Flow begins at block 804.

At block 804, a sheet of ferromagnetic face sheet material is cut to match a desired capture interface 116 outline (i.e. square, circular, hexagonal, etc). Most conventional cutting techniques may be used, however, if laser cutting is used, it should be performed prior to any annealing processes due to possibly changing ferromagnetic properties due to high heating. In the preferred embodiment, the ferromagnetic face sheet is made from Hiperco-50, which is an alloy of 49% Cobalt, 2% Vanadium, and the balance Iron. Flow proceeds to block 808.

At block 808, following cutting to the desired outline, the ferromagnetic face sheet 320, 404, 504 is annealed. Annealing is a heat treatment that alters the physical and sometimes chemical properties of a material to increase its ductility and reduce its hardness, making it more workable. It involves heating a material above its re-crystallization temperature, maintaining a suitable temperature for a suitable amount of time, and then cooling. Because the annealing temperature is above the melting point of aluminum, it must be performed prior to aluminum plating in step 812.

In annealing, atoms migrate in the crystal lattice and the number of dislocations decreases, leading to a change in ductility and hardness. As the material cools it re-crystallizes. For many alloys, including carbon steel, the crystal grain size and phase composition, which ultimately determine the material properties, are dependent on the heating, and cooling rate. Hot working or cold working after the annealing process alter the metal structure, so further heat treatments may be used to achieve the properties required. With knowledge of the composition and phase diagram, heat treatment can be used to adjust between harder and more brittle, to softer and more ductile.

In the cases of copper, steel, silver, and brass, this process is performed by heating the material (generally until glowing) for a while and then slowly letting it cool to room temperature in still air. Copper, silver, and brass can be cooled slowly in air, or quickly by quenching in water, unlike ferrous metals, such as steel, which must be cooled slowly to anneal. In this fashion, the metal is softened and prepared for further work—such as shaping, stamping, or forming. Flow proceeds to block 812.

At block 812, the annealed ferromagnetic face sheet is plated with aluminum. Aluminum or similar paint is not recommended due to a tendency to flake off; however electroplating processes may be used. Flow proceeds to block 816.

At block 816, optical patterns 308 are applied to one side of (the side that will be facing away from the recovery object 112) the plated face sheet. Anodization creates black areas and clear-coat anodized areas that have an appearance similar to grey metal. By choosing the right surface preparation before anodizing, the surface may have a matte appearance in order to create a diffused reflection. Flow proceeds to block 820.

At block 820, a matte clear coating is applied over the optical patterns 308. In the preferred embodiment, the matte clear coating is applied over the entire side of the plated face sheet containing the optical markings 308. Flow proceeds to decision block 824.

At decision block 824, a determination is made if a core 328, 512, 612 is required in the capture interface 116. A core 328, 512, 612 may be required if the capture interface 116 requires additional height, stiffness, or rigidity. Certain types of capture technologies such as mechanical gripping or harpoon capture may benefit from the presence of a core 328, 512, 612. If a core 328, 512, 612 is required, then flow proceeds to block 828. If a core 328, 512, 612 is not required, then flow instead proceeds to block 844.

At block 828, a core 328, 512, 612 is required, and core material is cut to match the capture interface outline discussed with respect to block 804. Flow proceeds to block 832.

At block 832, the core 328, 512, 612 is permanently bonded to the back side of the finished ferromagnetic face sheet 320, 504, 604 (i.e. the side without the optical patterns or fiducials 308). In one embodiment, an adhesive film 332 is placed between the ferromagnetic face sheet 320, 504, 604 and the core 328, 512, 612, as shown in FIG. 3C, and heat bonded to both surfaces. If mounting to a tank or other structure, screws, bolts, or other forms of attachment may be used. The adhesive film 332 must be space-rated and strong enough to prevent the ferromagnetic face sheet 320, 504, 604 from separating from the core 328, 512, 612 under high mechanical stress. In other embodiments, other methods for bonding the face sheets may be used such as soldering/brazing. Flow proceeds to block 836.

At block 836, face sheet material is cut in order to provide a rear or bottom face sheet 324, 508, 608. In the preferred embodiment, the rear or bottom face sheet 324, 508, 608 is non-ferrous in order to minimize the residual dipole and also possibly reduce mass. Most ferrous materials have a similar density as steel ~8-8.5 g/cc, while aluminum and AlSiC are approximately 2.7-3 g/cc. Additionally, because there is a relatively large gap between the front 320, 504, 604 and rear 324, 508, 608 facesheets, the back sheet doesn't actually assist magnetic gripping strength.

The rear face sheet 324, 508, 608 has the same outline as the front ferromagnetic face sheet 320, 504, 604 and the core 328, 512, 612. The rear face sheet 324, 508, 608 may be non-ferromagnetic since it is not directly involved in magnetic capture and it is desirable to minimize any further magnetic interference with the recovery object 112, the servicing spacecraft 104, and the capture device. However, the rear face sheet 324, 508, 608 does provide a benefit of additional stiffness and rigidity to the capture interface 116, especially when the core 328, 512, 612 is a honeycombed or other lightweight structure. Flow proceeds to block 840.

At block 840, the rear face sheet 324, 508, 608 is permanently bonded to a rear side of the core 328, 512, 612. The rear side of the core 328, 512, 612 is the side opposite to the front or ferromagnetic face sheet. In one embodiment, an adhesive film 332 may be placed between the rear face sheet 324, 508, 608 and the core 328, 512, 612, as shown in FIG. 3C, and heat bonded to both surfaces. The adhesive film 332 is a space-rated material and must be strong enough to prevent the ferromagnetic face sheet from separating from the core 328, 512, 612 under high mechanical stress. Flow proceeds to block 844.

At block 844, three or more holes 516 are drilled through the capture interface 116 in order to allow fasteners 336 to secure the capture interface 116 rigidly to an exterior surface of the recovery object 112. Flow ends at block 844.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A capture interface, configured to be rigidly affixed to an external surface of a recovery object and captured by a capture device, comprising:
    a matte ferromagnetic surface of flat disposition and geometric outline, configured to facilitate capture by the capture device, comprising:
    a capture interface identifier.

2. The capture interface of claim 1, wherein a placement location of the capture interface on the recovery object is determined by one or more of magnetic compatibility, a recovery object center of mass, an internal configuration of the recovery object, and a desire to minimize collision risk with appendages associated with the recovery object or the capture device.

3. The capture interface of claim 1, wherein the capture identifier uniquely identifies one or more of the capture interface or the recovery object, the capture identifier comprising one or more of:
    an optical pattern;
    a barcode;
    a radio frequency identity (RFID) tag; or
    a transponder beacon.

4. The capture interface of claim 1, wherein the capture identifier comprises one or more high contrast optical markings applied to a first side of the ferromagnetic surface, the one or more optical markings configured to allow the capture device to one or more of:
    determine a distance to the capture interface;
    determine one or more of a relative velocity and acceleration of the recovery object;
    determine tumbling of the recovery object by measuring a rotational period of the recovery object relative to a capturing servicing spacecraft;
    determine a position and rotation of the capturing servicing spacecraft that matches the recovery object, in order to allow a robotic manipulator to capture the recovery object through the capture interface;
    determine a pose relative to the capture interface, the pose comprising an angular displacement; and
    determine an orientation of the capture interface relative to the capture device, the orientation comprising one or more of roll, pitch, and yaw values.

5. The capture interface of claim 4, wherein the one or more high contrast optical markings are each of a different geometric configuration and generally distributed around a center point of the ferromagnetic surface.

6. The capture interface of claim 1, further comprising:
    a core of predetermined thickness and similar geometric outline as the ferromagnetic surface and permanently affixed to a second side of the ferromagnetic surface opposite to the first side, the predetermined thickness configured to provide stiffness and rigidity to the capture interface and allow a mechanical gripper of the capture device to capture the recovery object through the capture interface.

7. The capture interface of claim 6, further comprising:
    a rear surface of similar geometric outline as the ferromagnetic surface and permanently affixed to the core, the core disposed between the ferromagnetic and rear surfaces.

8. The capture interface of claim 7, further comprising:
    three or more standoffs of similar length and configured to position the capture interface a predetermined distance away from the recovery object, wherein the three or more standoffs are disposed between the rear surface and the recovery object and engaged by a plurality of fasteners configured to affix the capture interface to the recovery object.

9. The capture interface of claim 1, wherein the ferromagnetic surface further comprises:
    a base layer alloy of 49% Cobalt, 2% Vanadium, and the balance Iron;
    a layer of aluminum plating on at least one side of the base layer; and
    a matte clear protective coating over the optical markings.

10. The capture interface of claim 1, wherein the capture interface area is of regular geometric outline, wherein the capture interface is configured to be captured by magnetic, mechanical grasp, electroadhesion, gecko adhesion, resettable adhesion, snare/noose, and harpoon capture devices.

11. A method, comprising:
    forming a sheet of ferromagnetic material into a ferromagnetic surface, the ferromagnetic surface comprising a flat geometric outline;
    annealing the ferromagnetic surface;
    plating at least a first side of the annealed ferromagnetic surface;
    applying one or more high contrast optical markings to the first side of the plated ferromagnetic surface; and applying a matte clear protective coating over the aluminum plating and optical markings.

12. The method of claim 11, wherein the ferromagnetic material is an alloy of 49% Cobalt, 2% Vanadium, and the balance Iron.

13. The method of claim 11, wherein the one or more high contrast optical markings are each of a different geometric configuration and arranged symmetrically around a center point of the plated ferromagnetic surface.

14. The method of claim 11, further comprising:
affixing a core of predetermined thickness and having similar geometric outline as the ferromagnetic surface to a second side of the plated ferromagnetic surface opposite to the first side, a core material and the predetermined thickness configured to provide stiffness and rigidity to the ferromagnetic surface.

15. The method of claim 14, further comprising:
affixing a non-ferromagnetic rear surface of similar geometric outline as the ferromagnetic surface to the core, the core disposed between the ferromagnetic and rear surfaces and permanently affixed to both surfaces.

16. The method of claim 15, further comprising:
providing three or more attachment points to an assembly comprising the permanently affixed ferromagnetic surface, the core, and the rear surface, the attachment points configured to allow fasteners to affix the assembly to an outer surface of a recovery object in order to facilitate capture of the recovery object by a capture device.

17. The method of claim 16, wherein the assembly being of geometric outline and configured to be captured by one or more of magnetic, mechanical grasp, electroadhesion, gecko adhesion, resettable adhesion, snare/noose, and harpoon capture devices.

18. The method of claim 16, wherein the method further comprising:
applying an identifier to the assembly to identify one or more of the assembly and the recovery object, the identifier comprising one or more of:
an optical pattern;
a barcode;
a radio frequency identity (RFID) tag; or
a transponder beacon.

19. The method of claim 16, further comprising:
providing a same number of standoffs of predetermined length as the number of attachment points, the three or more standoffs configured to space the assembly from the recovery object by the predetermined length.

20. The method of claim 19, wherein the assembly, standoffs, and fasteners are selected and configured to fully disintegrate upon reentry into the earth's atmosphere from earth orbit.

* * * * *